(12) United States Patent
Wyness

(10) Patent No.: US 6,521,126 B2
(45) Date of Patent: Feb. 18, 2003

(54) PIPE GALLERY FOR WATER FILTRATION SYSTEMS

(76) Inventor: David K. Wyness, 91 W. Plaza del Sol, Islamorada, FL (US) 33036

( * ) Notice: Subject to any disclaimer, the term of this patent is extended or adjusted under 35 U.S.C. 154(b) by 0 days.

(21) Appl. No.: 09/846,675

(22) Filed: May 1, 2001

(65) Prior Publication Data

US 2002/0162783 A1 Nov. 7, 2002

(51) Int. Cl.[7] ................................................. B01D 24/46
(52) U.S. Cl. ....................................... 210/277; 210/284
(58) Field of Search ................................. 210/275, 277, 210/278, 284, 333.01, 333.1, 427, 541

(56) References Cited

U.S. PATENT DOCUMENTS

| | | | | | |
|---|---|---|---|---|---|
| 476,737 | A | * | 6/1892 | Deutsch | 210/286 |
| 1,797,709 | A | * | 3/1931 | Apeldorn | 210/268 |
| 2,000,696 | A | * | 5/1935 | Friend et al. | 210/275 |
| 3,312,348 | A | * | 4/1967 | Greenleaf | 210/277 |
| 3,847,805 | A | * | 11/1974 | Voedisch | 210/675 |

* cited by examiner

Primary Examiner—Ivars Cintins
(74) Attorney, Agent, or Firm—Marshall, Gerstein & Borun

(57) ABSTRACT

A pipe gallery includes an exterior peripheral wall containing a gallery upper chamber, a backwash waste chamber, and a gallery lower chamber. A gallery influent line and filter influent pipes are connected to the gallery upper chamber. A backwash drain line and secondary pipes are connected to the backwash waste chamber. Filter effluent pipes and a gallery effluent line are connected to the gallery lower chamber. The lower chamber may also include a separate supply chamber, to which a gallery backwash supply line and filter backwash pipes are connected. The filter influent pipes and secondary pipes may be connected to the top chambers of filter cells in a filtration system, while the filter effluent pipes are connected to bottom chambers of the cells. Valves are used to create separate filtering and backwash pathways.

6 Claims, 4 Drawing Sheets

PIPE GALLERY FOR WATER FILTRATION SYSTEMS

BACKGROUND OF THE INVENTION

This invention relates generally to water filtration systems. More particularly, the invention is directed to filtration systems that include gravity filters that are periodically backwashed.

Gravity filters used to filter water commonly include a filter top chamber, a filter medium at the bottom of the filter top chamber, and a filter bottom chamber. Influent is received in the filter top chamber, and passes through the filter medium before being collected and removed through a filter effluent line. Flow through the filter medium slows as the medium becomes filled with waste, or it takes more pressure to force the same flow rate through the dirty filter media. Thus, the medium is periodically cleaned to increase the rate of flow or decrease the required pressure.

It is known that the medium can be cleaned by backwashing. Backwashing generally involves stopping the supply of influent to the filter top chamber and adding pressure to the liquid in the filter bottom chamber, causing the direction of flow through the medium to be reversed. The dirty water is then removed from the filter top chamber and discharged through a separate line.

It is conventional for a facility to have multiple filter cells to prevent interruption of filtration while one of the filter cells is being backwashed. In such facilities, the filter influent line can be divided into separate branches leading to each of the filter cells, with valves on each branch enabling the operator to shut off the flow to any selected cell while that cell is backwashed. Separate lines from each cell are used to discharge backwashed water.

Pressure for backwashing may be supplied by a backwash supply pump, or from the hydraulic head in the other filter cells or in a separate backwash supply tank or standpipe. Systems are conventionally designed so that the volume of liquid needed to backwash a cell is provided by operating the remaining filter cells at design rates. It has been known that increasing the height of the top chambers of the filter cells allows additional liquid volume to be stored in the cells, permitting backwashing to occur even when the system is operating at less than design conditions.

SUMMARY OF THE INVENTION

The invention relates to a new vertical pipe gallery that may be shop-built to significantly facilitate the connections and piping used in water filtration systems. The pipe gallery includes an exterior peripheral wall containing a gallery upper chamber, a backwash waste chamber, and a gallery lower chamber. A gallery influent line and a plurality of filter influent pipes are connected to the gallery upper chamber. A backwash drain line and a plurality of secondary pipes are all connected to the backwash waste chamber. A plurality of filter effluent pipes and a gallery effluent line are all connected to the gallery lower chamber.

In one embodiment of the invention, the lower chamber also contains a separate supply chamber, to which a gallery backwash supply line and a plurality of filter backwash pipes are connected.

The pipe gallery may be used in a liquid filtration system containing a plurality of conventional filter cells, each filter cell comprising a filter top chamber, a filter medium at the bottom of the filter top chamber, and a filter bottom chamber beneath the filter medium. The filter influent pipes and secondary pipes are connected to the top chambers of the filter cells, and the filter effluent pipes are connected to the bottom chambers of the filter cells.

To filter water, valves are used to open a filtering pathway that extends from the gallery influent line through the gallery upper chamber and the filter influent pipes to one or more of the top chambers of the filter cells. From there, the water flows through the filter medium into the lower chamber of the filter cells, then through the filter effluent pipes and the lower chamber of the gallery and to the gallery effluent line. Other valves are used to isolate the backwash drain line from the filtering pathway and to isolate any gallery backwash supply line from the filtering pathway.

To backwash a filter cell, valves are used to open a backwash pathway from the gallery lower chamber to the bottom chamber of the filter, through the medium and into the top chamber of the filter. From there, the water flows through an associated secondary pipe and the backwash waste chamber to the backwash drain line. Valves isolate the filter effluent line and the gallery upper chamber from the backwash pathway while the backwashing process is underway. When a separate backwash supply chamber is provided, the backwash pathway begins in the backwash supply chamber and reaches the filter through the filter backwash pipe associated with the filter cell being backwashed.

BRIEF DESCRIPTION OF THE DRAWINGS

The invention may be better understood by reference to the accompanying drawings, in which.

DETAILED DESCRIPTION OF THE INVENTION

Figure 1:
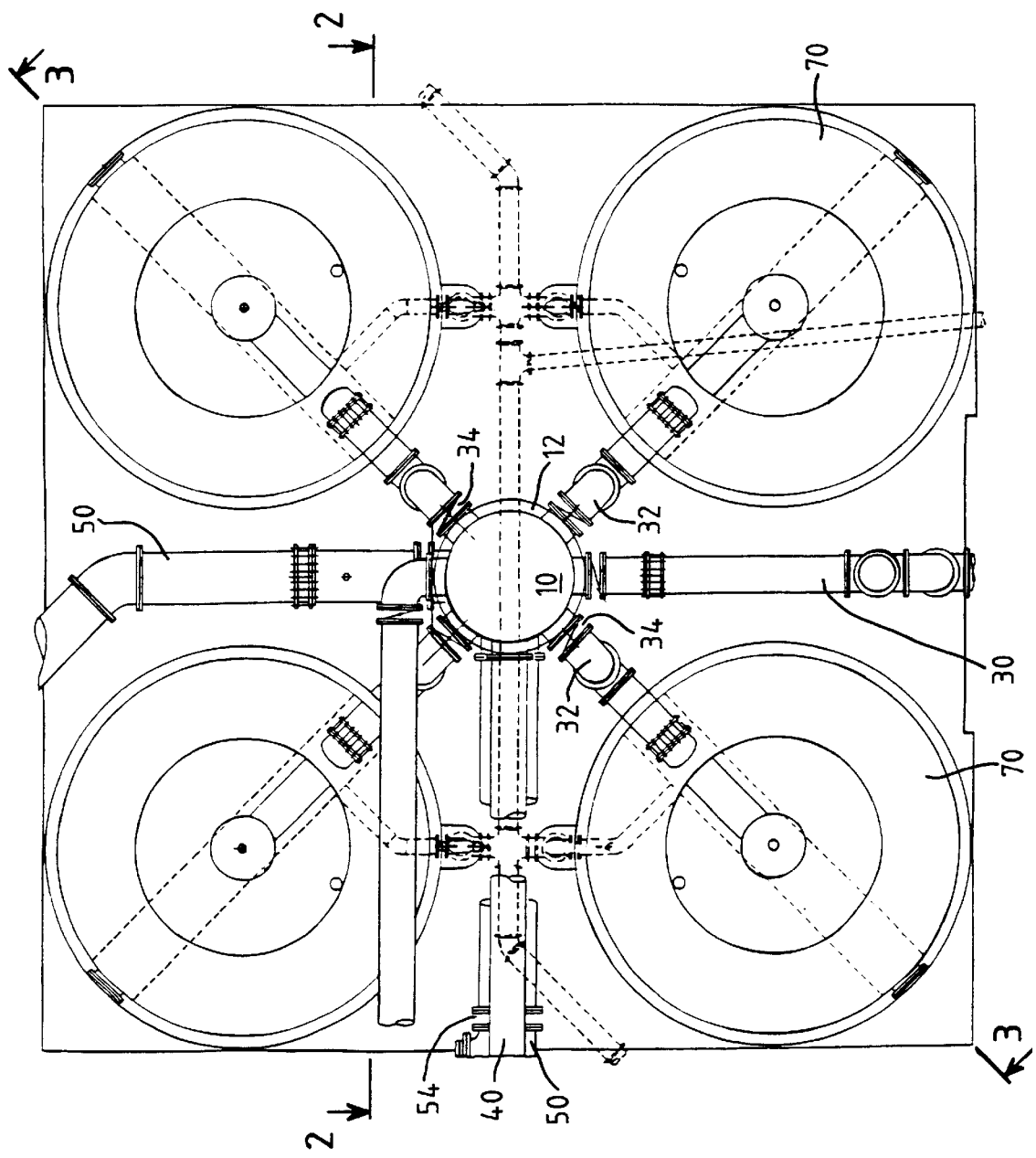
FIG. 1 is a plan view of a liquid filtration system comprising one embodiment of such a pipe gallery in accordance with the present invention.
Figure 2:
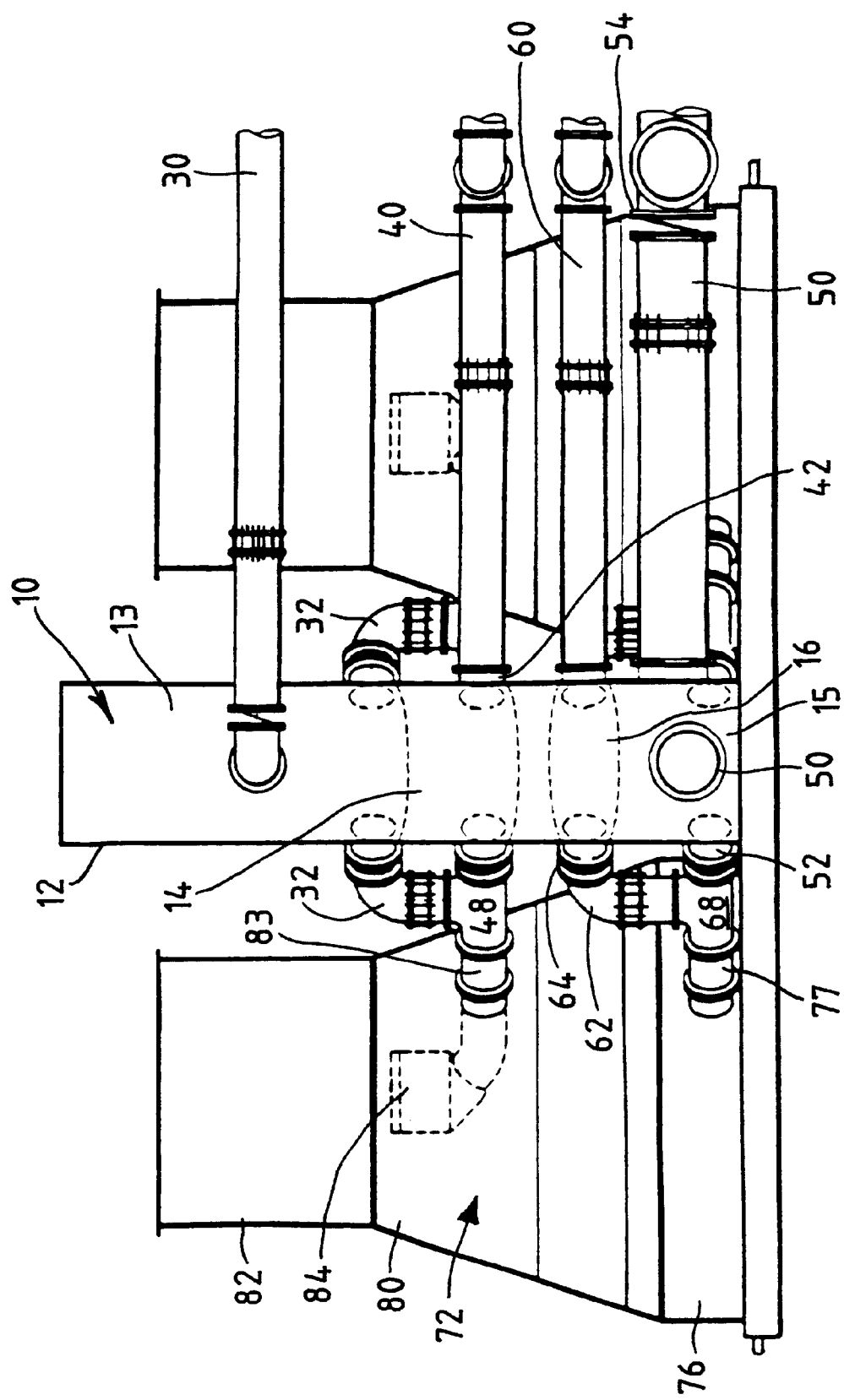
FIG. 2 is a front sectional view through section 2—2 of FIG. 1.
Figure 3:
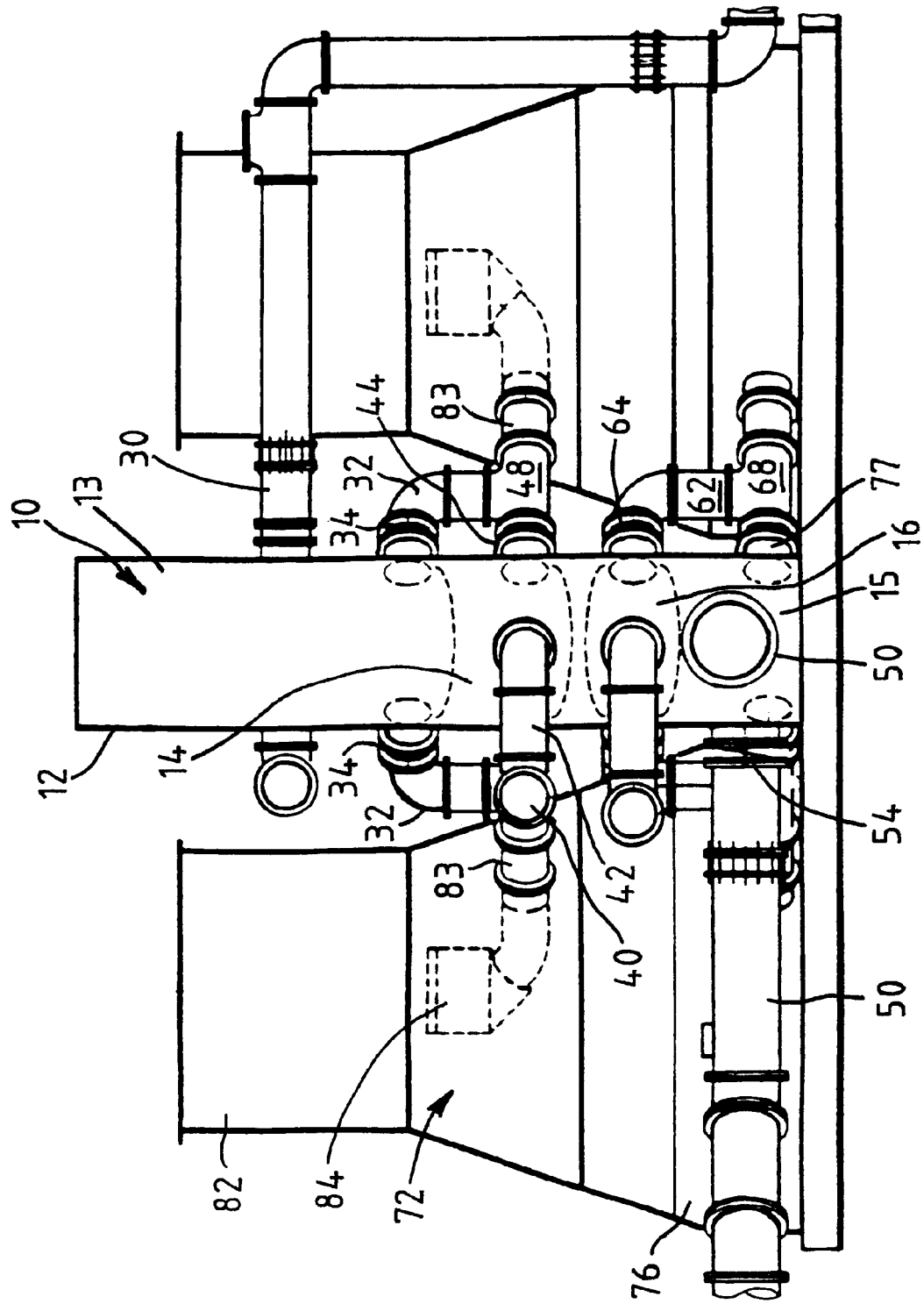
FIG. 3 is a side sectional view through section 3—3 of FIG. 1.

FIGS. 1–4 show examples of vertical pipe galleries 10, 10' in accordance with two embodiments of two embodiments of the present invention. In each case, the pipe gallery includes an exterior peripheral wall 12 containing a gallery upper chamber 13 (seen in FIGS. 2–4), a backwash waste chamber 14 beneath the gallery upper chamber, and a gallery lower chamber 15 beneath the backwash waste chamber. As illustrated, the pipe gallery is about 36 feet tall. The peripheral wall is an 8-foot diameter wall having a thickness of approximately ¼". In one embodiment of the invention (seen in FIGS. 2–4), the lower chamber includes a separate backwash supply chamber 16. A gap is shown between the backwash waste chamber and the gallery lower chamber. This gap is provided to minimize the chance of contaminating the water in the gallery lower chamber in case of a leak in the floor of the backwash waste chamber. The invention can be configured without that gap.

A gallery influent line 30 and a plurality of filter influent pipes 32 are connected to the gallery upper chamber 13. As illustrated, both the gallery influent line and the filter influent pipes are 30" diameter pipes. The filter influent pipes are provided with an influent valve 34, which is typically a butterfly valve. Prefabricating the valves and pipes onto the pipe gallery can reduce the financial and time costs of field installation. The gallery upper chamber may include baffles (not shown) that divide the influent flow between each of the filter influent pipes.

A backwash drain line 40 and a plurality of secondary pipes 42 are all connected to the backwash waste chamber 14. As illustrated, both the backwash drain line and the secondary pipes are 30" diameter pipes. The secondary pipes are provided with a secondary valve 44, which is also typically a butterfly valve. The backwash waste chamber may include a vent pipe (not shown), such as a 6" steel vent pipe. The backwash drain line may be provided with a valve 46, typically a butterfly valve, to make it easier to control the backwash flow rate. A t-connector 48 joins each secondary pipe to one of the filter influent pipes 32. The t-connector may also be prefabricated onto the pipe gallery.

Two gallery effluent lines 50 and a plurality of filter effluent pipes 52 are all connected to the gallery lower chamber 15. As illustrated, one of the gallery effluent lines is a 42" diameter pipe, and the other is a 48'" diameter pipe. The filter effluent pipes are 30" diameter pipes. Each filter effluent pipes is provided with an effluent valve 54, which is again typically a butterfly valve. The gallery effluent line may be provided with a valve 56, typically a butterfly valve.

In the first embodiment of the invention (seen in FIGS. 1–3), a gallery backwash supply line 60 and a plurality of filter backwash pipes 62 (best seen in FIG. 2) are all connected to the backwash supply chamber 16. As illustrated, the gallery backwash supply line and filter backwash pipes are all 30" diameter pipes. The filter backwash pipes are provided with a backwash valve 64. A t-connector 68 joins each filter backwash supply pipe to one of the filter effluent pipes 52. The gallery backwash supply line may be provided with a valve 66, typically a butterfly valve.

Figure 4:
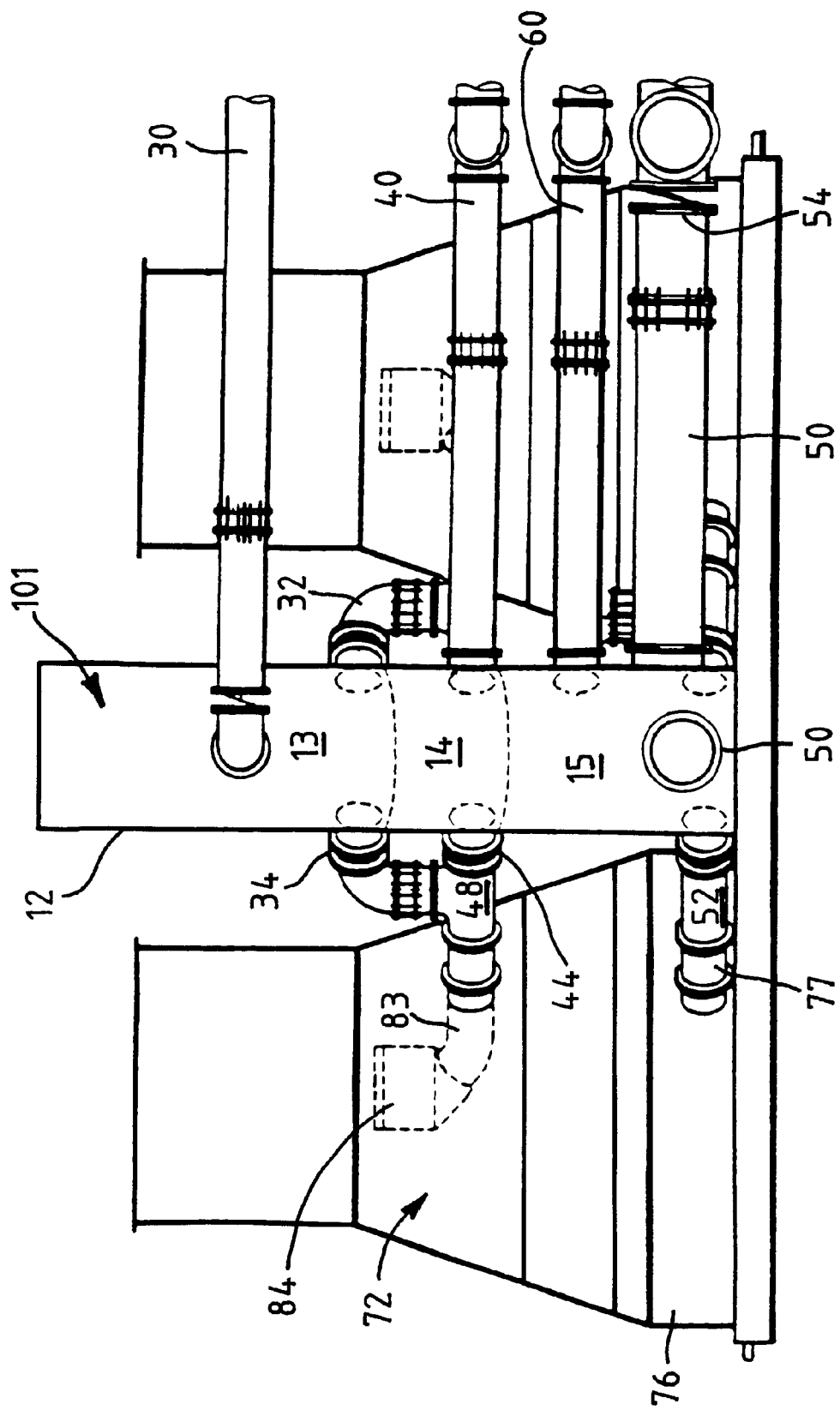
FIG. 4 is a view, corresponding to FIG. 4, of system including another embodiment of pipe gallery in accordance with this invention.

In the second embodiment of the invention, seen in FIG. 4, the backwash supply line 60 is connected directly to the lower chamber 15.

The gallery may be prefabricated with some or all of the pipes, valves, and connectors discussed above. Prefabrication can reduce the financial and time costs of construction.

As seen in the figures, the pipe galleries 10, 10' may be used in a liquid filtration system having multiple filter cells 70. Each filter cell has a filter top chamber 72, a filter medium at the bottom of the filter top chamber, and a filter bottom chamber 76 beneath the filter medium.

As illustrated, the filter top chambers 72 include a frusto-conical section 80 beneath an upper stack 82. The frusto-conical section is approximately 26' in diameter at its base, and about 15' in diameter and about 16', 4" high. The upper stack has a diameter of about 15', and is about 14' 3" high. These dimensions and shapes can vary. Liquid to be filtered enters the filter top chamber through a filter top pipe 83 that leads from the t-connector 48 on the filter influent pipe to a centrally-disposed filter inlet weir 84.

The filter medium could consist, for example, of a 5' thick layer of granular activated carbon (GAC) above a 2' thick sand layer. The filter medium materials and filter medium layer thicknesses are not important to the invention. Instead of two media, a single filter medium, or more than two filter media, may be used.

The filter bottom chamber 76 is about 5' high, and is connected by a filter bottom pipe 77 to either the t-connector 68 on the filter effluent pipe 52 (in the first embodiment of the invention, seen in FIGS. 1–3), or directly to the filter effluent pipe (in the second embodiment of the invention, seen in FIG. 4).

To filter water, the influent valves 34 and the effluent valves 54 are opened to open a filtering pathway that extends from the gallery influent line 30 through the gallery upper chamber 13 and the filter influent pipes 32 to each of the filter cells, and from each of the filter cells through the filter effluent pipes 52 and the gallery lower chamber 15 to the gallery effluent line 50. The secondary valves 44 are used to isolate the backwash drain line 40 from the filtering pathway.

To backwash a filter cell, the filtering pathway to the cell to be backwashed is first closed by shutting the filter influent valve 34 on the filter influent pipe 32 associated with that cell. With the supply of water entering that cell stopped, the level of water in that cell gradually drops as the water continues to be filtered and removed from the cell through the filter effluent pipe 52. Filter effluent valves 54 of the operating filter cells, or the gallery effluent valve 56, if provided, are closed if and when it is desired to store backwash supply water in the filter top chambers of the operating filter cells. The filter effluent valve 54 on the cell to be backwashed is closed when the water level has dropped to its lowest level, or when it is otherwise desired to start the backwash. The secondary valve 44 is then opened to provide a path for the filter backwash waste water that will come from the filter cell to be backwashed through its associated secondary pipe 42 and the backwash waste chamber 14 to the backwash drain line 40.

Backwashing begins when the filter effluent valves 54 of the operating filter cells are opened. This allows the water being filtered, and the water stored in the operating filters, to flow into the bottom chamber 76 of the filter cell, increasing the pressure and reversing the direction of flow through the filter medium. The filter effluent valve 54 of the filter cell being backwashed remains closed, isolating the backwash pathway from the gallery effluent line 50.

In either embodiment of the invention, the backwash supply water can come from one or more of three sources. First, the water can come from the flow being treated by the three filter cells that are still in service. If the cells in service are operating at design capacity, they should provide sufficient flowrate for the entire backwash process. Second, the water can come from an externally pumped backwash water supply. Third, some of the water can also come from stored water in the filter top chamber 72 of the operating filters. If, for example, it is known that backwashing one of the filter media will require a backwash flow of 7960 gallons per minute for 20 minutes, then it can be determined that a volume of 159,200 gallons will be necessary for backwashing. The upper stacks of the filters can be designed to be tall enough so that they accommodate that volume of water, allowing those filters to remain in service while the backwashing occurs. In the case where the backwash water comes from an externally pumped backwash supply, the backwash is initiated by opening the filter backwash valve 64 of the filter cell to be backwashed and the gallery backwash supply valve 66.

This detailed description has been given for clarity of understanding only. It is not intended and should not be construed as limiting the scope of the invention, which is defined in the following claims.

What is claimed is:

1. A liquid filtration system comprising:
   a vertical pipe gallery comprising an exterior peripheral wall and an upper chamber, a backwash waste chamber, and a lower chamber within the peripheral wall;

a plurality of filter influent pipes connected to the pipe gallery in fluid communication with the upper chamber;

a gallery influent line connected to the pipe gallery in fluid communication with the upper chamber;

a plurality of secondary pipes connected to the pipe gallery in fluid communication with the backwash waste chamber;

a backwash drain line connected to the pipe gallery and in fluid communication with the backwash waste chamber;

a plurality of filter effluent pipes connected to the pipe gallery in fluid communication with the lower chamber;

a gallery effluent line connected to the pipe gallery in fluid communication with the lower chamber; and a plurality of filter cells each comprising a top chamber in fluid communication with one of the filter influent pipes and with one of the secondary pipes, and a bottom chamber in fluid communication with one of the filter effluent pipes.

2. A liquid filtration system comprising:

a vertical pipe gallery comprising an exterior peripheral wall and an upper chamber, a backwash waste chamber, and a lower chamber within the peripheral wall;

a plurality of filter effluent pipes connected to the pipe gallery in fluid communication with the lower chamber;

a gallery effluent line connected to the pipe gallery in fluid communication with the lower chamber;

a plurality of filter influent pipes connected to the pipe gallery in fluid communication with the upper chamber;

a gallery influent line connected to the pipe gallery in fluid communication with the upper chamber;

a plurality of secondary pipes connected to pipe gallery in fluid communication with the backwash waste chamber;

a backwash drain line connected to the pipe gallery in fluid communication with the backwash waste chamber;

a plurality of filter cells each comprising a top filter chamber in fluid communication with one of the filter influent pipes and with one of the secondary pipes; and a bottom filter chamber in fluid communication with one of the filter effluent pipes; and valves enabling:
 a) the opening of a filtering pathway that extends from the gallery influent line through the gallery upper chamber and the filter influent pipes to the filter cells, and from the filter cells through the filter effluent pipes and the gallery lower chamber to the gallery effluent line;
 b) the isolation of the backwash drain line from the filtering pathway; and
 c) the opening of a backwash pathway for each filter cell, the backwash pathway for each filter cell extending from the gallery lower chamber, to the lower chamber of the filter cell, through that filter cell, the secondary pipe associated with that filter cell, and the backwash waste chamber to the backwash drain line.

3. A liquid filtration system as recited in claim 1, in which:

the lower chamber further comprises a separate backwash supply chamber;

a plurality of filter backwash pipes are connected to the pipe gallery in fluid communication with the backwash supply chamber; and a gallery backwash supply line is connected to the pipe gallery in fluid communication with the backwash supply chamber.

4. A liquid filtration system as recited in claim 3, and further comprising:

valves enabling:
 a) the opening of a filtering pathway from the gallery influent line through the gallery upper chamber and the filter influent pipes to the filter cells, and from the filter cells through the filter effluent pipes and the gallery lower chamber to the gallery effluent line;
 b) the isolation of the backwash drain line from the filtering pathway;
 c) the opening of a backwash pathway for each filter cell, the backwash pathway for each filter cell extending from the gallery backwash supply line through the backwash supply chamber, through the filter backwash pipe to that filter cell, and from that filter cell through the secondary pipe associated with that filter cell and the backwash waste chamber to the backwash drain line; and
 d) the isolation of the gallery effluent line from the backwash pathway.

5. A liquid filtration system as recited in claim 1, and further comprising:

a backwash supply line connected to the pipe gallery in fluid communication with the lower chamber.

6. A liquid filtration system as recited in claim 5, and further comprising:

valves enabling:
 a) the opening of a filtering pathway from the gallery influent line through the gallery upper chamber and the filter influent pipes to the filter cells, and from the filter cells through the filter effluent pipes and the lower gallery chamber to the gallery effluent line;
 b) the isolation of the backwash drain line from the filtering pathway; and
 c) the opening of a backwash pathway for each filter cell, the backwash pathway for each filter cell extending from the gallery backwash supply line through the gallery lower chamber and one of the filter effluent pipes to that filter cell, and from that filter cell through the secondary pipe associated with that filter cell and the backwash waste chamber to the backwash drain line.

* * * * *